May 31, 1955 R. T. STACEY 2,709,309

COMPUTING DEVICE

Filed Aug. 7, 1953 2 Sheets-Sheet 1

INVENTOR.
RICHARD T. STACEY
BY Patrick D. Beavers
ATTORNEY

May 31, 1955 R. T. STACEY 2,709,309

COMPUTING DEVICE

Filed Aug. 7, 1953 2 Sheets-Sheet 2

INVENTOR.
RICHARD T. STACEY
BY Patrick D. Beavers
ATTORNEY

United States Patent Office 2,709,309
Patented May 31, 1955

2,709,309

COMPUTING DEVICE

Richard T. Stacey, Bamberg, S. C.

Application August 7, 1953, Serial No. 372,915
4 Claims. (Cl. 35—31)

This invention appertains to computing or calculating devices of the manually manipulatable type and particularly to rotatable dial type computers.

The primary object of this invention is to provide an extremely simple and easily manipulated and understood device for aiding school children in learning the multiplication tables.

Another object of this invention is to provide a pair of superimposed relatively rotatable rectangular plates which have numbers disposed on their opposite faces at the corners thereof and which have their inner faces provided with answers, the plates having apertures that selectively expose the answers and the answers and apertures being so correlated that when an indicator formed on the outer face of both plates points to a number on the inner face of the other plate, the answers to the multiplication of such selected number by the numbers 2 to 9 are exposed to view. And the answers are so disposed to the numbers on the inner face of the one plate and the outer face of the other plate that they are visibly exposed in adjacency to such numbers to be easily related thereto. Thus, for example, the numbers 3, 5, 7 and 9 are disposed on both faces of one plate at the corners thereof and the numbers 2, 4, 6 and 8 are similarly provided on the faces of the other plate. When the plates are rotated to project their corners beyond the sides of the other it can be seen, that, viewed from the outer face of either plate, the numbers 2 to 9 will be visible.

The numbers are set up on the inner face of each plate in a form of multiplication by an identical number, that is, 2×2, 3×3, 4×4, etc. Thus, when the indicator on the outer face of one plate points to a corner of the inner face of the other plate, it points to 2×2, 3×3, etc. For example, if it points to 2×2, then the apertures in such plate, having the indicator will expose the answers on the inner face of the other plate for the multiplication of 2 by every number from 2 to 9. And each answer will be exposed to view so that it is situated in proximity to the multiplier as the indicator points to the multiplicand 2. Thus, since the numbers 2 to 9, formed on the outer face of the one plate and inner face of the other plate, will be exposed to view in a circular arrangement, the answers to the multiplication of 2 times each number from 2 to 9 will be exposed to view adjacent, or specifically radially inwardly of, each multiplier.

These and ancillary objects are attained by this invention, the preferred embodiment of which is set forth in the following description and illustrated in the accompanying drawing, wherein.

Figures 1, 2, 3:
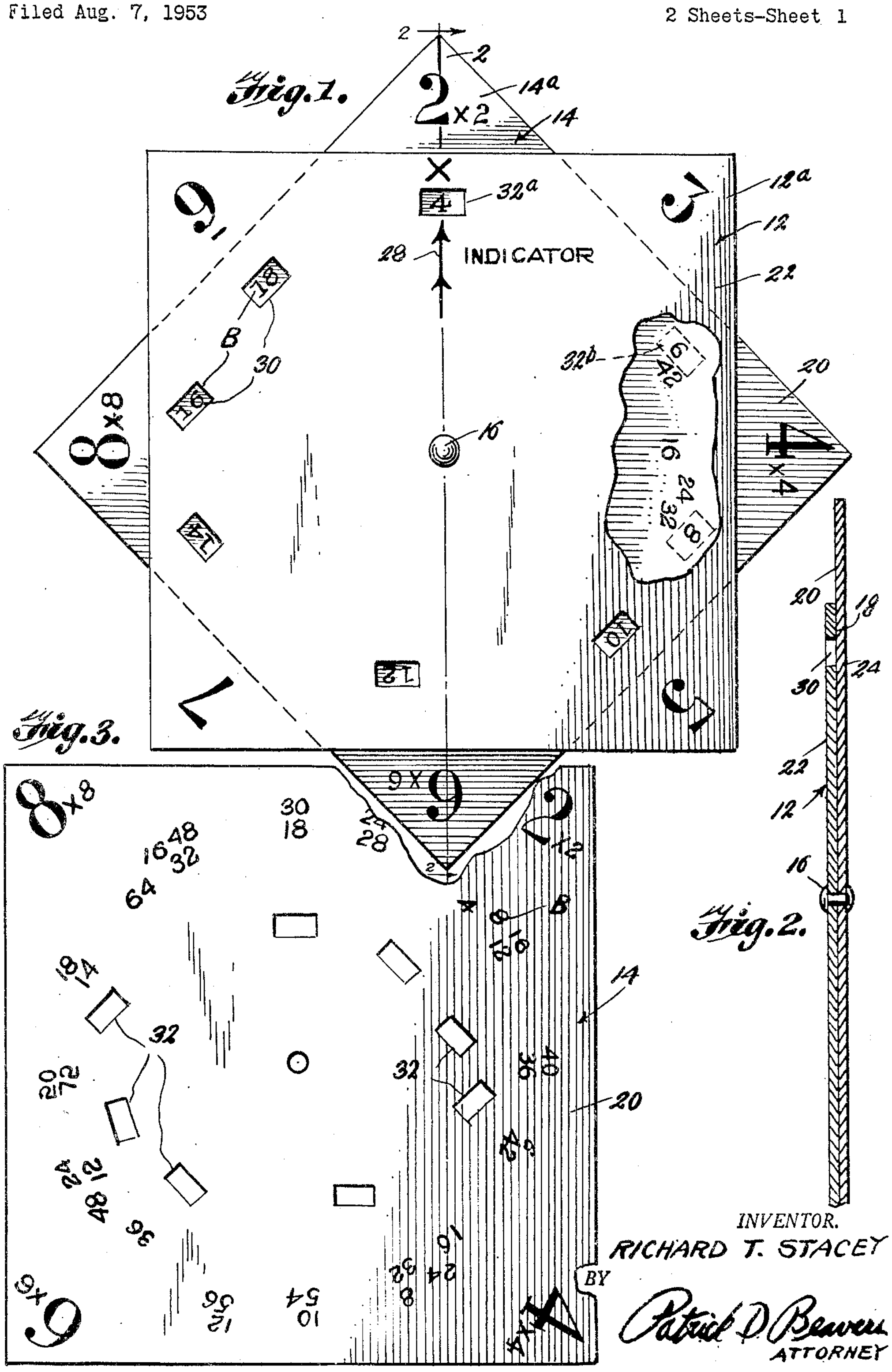
Figure 1 is a plan view of the computer with the plates shown out of coincidence and a portion of the uppermost one broken away.
Figure 2 is a cross sectional view taken on line 2—2 of Figure 1.
Figure 3 is a plan view of the inner face of one of the plates.

In the accompanying drawings, the computing device 10 includes a pair of rectangular plates 12 and 14, which may be formed from any suitable material. For economy, the plates may be formed from comparatively stiff cardboard or they may be stamped from sheet metal or plastic. The plates are flat and are relatively thin, as shown in Figure 2, and are of identical dimensions. The plates are mounted together for relative rotative movement by a rivet 16 disposed centrally thereof. The inner faces 18 and 20 of the plates are in confronting relation and their outer faces 22 and 24 are provided with indicating answers or indicators 26 and 28. The indicators are formed on the faces 22 and 24 radially from the centers thereof to one side.

The plate 12 has its outer face 22 provided with the numbers 3, 5, 7 and 9 at the corners thereof, as shown in Figure 1, and the plate 14 has its outer face 24 formed at the corners thereof with the numbers 2, 4, 6 and 8. The numbers may be suitably disposed or inscribed on the faces. The plate 12, as shown in Figure 1, has answer apertures 30 of rectangular shape formed therethrough. The apertures 30 are located radially of the pivot 16 and in proximity to the side edges of the plate. The plate 14, as shown in Figure 4, has answer apertures 32 of rectangular shape formed therethrough, the apertures 32 being spaced radially of the rivet 16 and disposed adjacent thereto.

Figures 4, 5:
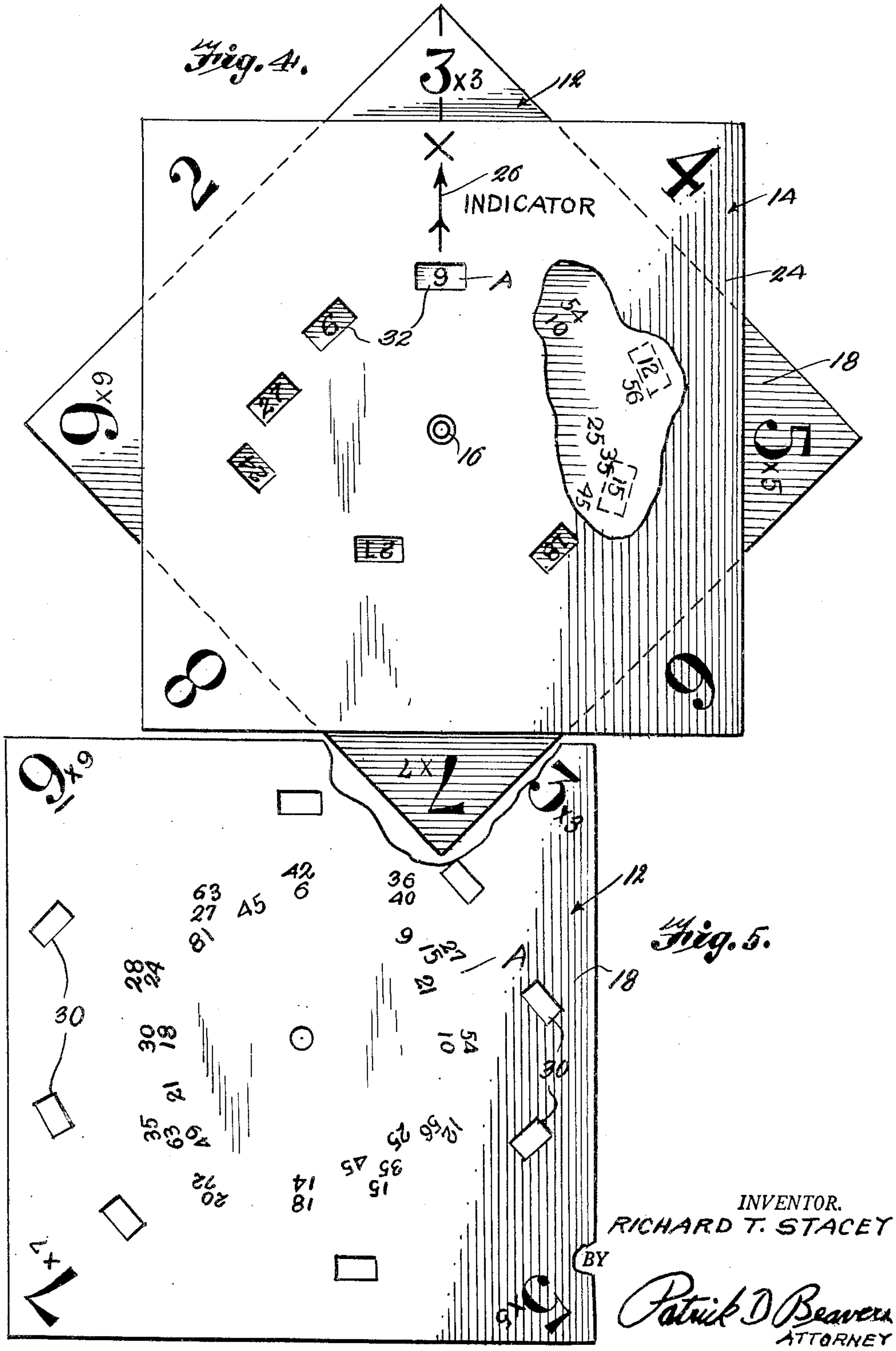
Figure 4 is a plan view of the computer showing the outer face of the other plate or showing the computer turned over from the view in Figure 1.
Figure 5 is a plan view of the inner face of the other of said plates.

The inner face 18 of the plate 12, as shown in Figure 5, has a series of numbers formed in a circular arrangement A, which numbers constitute the answers to all multiplication of the numbers 3, 5, 7 and 9 by multipliers 2 to 9. As shown in Figure 5, the numbers 3, 5, 7 and 9 are disposed on the inner face at the corners thereof and are in the form of multipliers and multiplicands, that is, 3×3; 5×5; 7×7; and 9×9. The circular arrangement A of the answers is within the arrangement of apertures 30.

The inner face 20 of the plate 14 shown in Figure 3, has a series of numbers formed in a circular arrangement B, which numbers constitute the answers to the multiplication of the numbers 2, 4, 6 and 8 by multipliers 2 to 9. The numbers 2, 4, 6 and 8 are disposed on the inner face at the corners thereof and the circular arrangement B is disposed around the apertures 32.

The numbers of the arrangement A are so positioned on the inner face 18 as to be exposed by the apertures 32 and the numbers of the arrangement B are so positioned on the inner face 20 as to be exposed by the apertures 30. In this respect, it will be noted that the apertures 30 and 32 are not in a true circular arrangement but are formed so that each number answer on the inner faces 18 and 20 will be exposed at the proper time.

For example, in Figure 1, the pointer or indicator 28 is directed toward the corner 14*a* of the plate 14, with the plates 12 and 14 rotated out of coincidence to project the corners of the inner face 20 of the plate 14 beyond the sides of the plate 12. Thus, the question 2×2 is selected and the answer "4," which is on the inner face 20 is exposed to view through the aperture 32*a*. The answer thus appears directly inwardly or radially inwardly of the corner 14*a*. Adjacent each of the corners of the inner face 14 and outer face 22 of the plate 12 an aperture 32 is disposed and each aperture uncovers an answer. Thus progressing clockwise around the face 22, the aperture 32*b* uncovers the answer "6" adjacent the corner 12*a* which has the number 3 disposed thereon. The answers to the multiplication of 2 by every number 2 to 9 is set up. Thus, when a number is selected, the answer to the immediate problem, such as 2×2 of Figure 1 or, for further example, 3×3 of Figure 4 is exposed adjacent the corner having the selected number and also simultaneously, the answers to the multiplication of such selected number by every number 2 to 9 are exposed.

It is believed that the use of the device will be apparent from a consideration of Figures 1 and 4 and for such consideration the ease of operation, simplicity and accuracy of the device can be appreciated. Especially will the device be of value to school children in aiding them in memorizing the multiplication tables.

What is claimed is:

1. In a computing device, a pair of rectangular plates mounted centrally together for relative rotative movement, each plate having a number disposed at its corners on each face thereof, said plates being rotatable relative to each other to move them out of coincidence and project the corners of each beyond the edges of the other and expose the numbers thereon to view, said plates having inner faces confronting each other and outer faces, the outer faces having an indicator formed thereon between the center and one edge thereof which indicator serves as a point of orientation, the inner faces of each plate having answers provided therein to multiplication problems and each plate having apertures registerable with the answers on the inner face of the other plate.

2. In a computing device, a pair of rectangular superimposed plates mounted centrally together for relative rotative movement, each of said plates having an inner and outer face and the plates having their inner faces in confronting relation and provided with answers to multiplication problems, said plates having a number disposed on each face at the corners thereof and the numbers being disposed so that the numbers 2 to 9 are exposed to view from the outer side of each plate when the plates are rotated out of coincidence to project the corners of each plate beyond the side edges of the other, an indicator provided on the outer face of each plate, the numbers on the inner face of each plate having a designation of multiplication by an identical number, each plate having apertures therein to expose the answers on the inner face of the other plate and the answers and apertures being so correlated that when the indicator on one of the plates points to a number on the corner of the inner face of the other plate the answers to the multiplication of such number by every number from 2 to 9 is exposed to view.

3. A computing device as claimed in claim 2, where the apertures in one plate are disposed around the center of the plate in adjacency to the center and the apertures in the other plate are disposed radially around the center thereof in adjacency to the side edges thereof.

4. A computing device as claimed in claim 2, wherein the numbers on the outer face of one plate are correlated with the apertures therein and answers on the inner face of the other plate so that when the indicator on such plate is directed toward a number on the inner face at the corner of the other plate, the answers to the multiplication of such selected number by the numbers on the outer face are exposed to view in adjacency to such numbers.

References Cited in the file of this patent

UNITED STATES PATENTS

| | | |
|---|---|---|
| 809,294 | Fry | Jan. 9, 1906 |
| 1,161,381 | Duffy | Nov. 23, 1915 |
| 1,732,983 | Orchard | Oct. 22, 1929 |

FOREIGN PATENTS

| | | |
|---|---|---|
| 964,720 | France | Feb. 1, 1950 |